(12) United States Patent
Ghannouchi et al.

(10) Patent No.: US 11,588,520 B2
(45) Date of Patent: Feb. 21, 2023

(54) MULTI-CELL PROCESSING ARCHITECTURES FOR MODELLING AND IMPAIRMENT COMPENSATION IN MULTI-INPUT MULTI-OUTPUT SYSTEMS

(71) Applicants: Fadhel M. Ghannouchi, Calgary (CA); Aidin Bassam, Calgary (CA); Mohamed Helaoui, Calgary (CA); Ramzi Darraji, Calgary (CA)

(72) Inventors: Fadhel M. Ghannouchi, Calgary (CA); Aidin Bassam, Calgary (CA); Mohamed Helaoui, Calgary (CA); Ramzi Darraji, Calgary (CA)

( * ) Notice: Subject to any disclaimer, the term of this patent is extended or adjusted under 35 U.S.C. 154(b) by 0 days.

(21) Appl. No.: 17/367,451

(22) Filed: Jul. 5, 2021

(65) Prior Publication Data

US 2021/0409079 A1 Dec. 30, 2021

Related U.S. Application Data

(63) Continuation of application No. 16/812,452, filed on Mar. 9, 2020, now Pat. No. 11,057,081, which is a continuation of application No. 15/483,382, filed on Apr. 10, 2017, now Pat. No. 10,587,315, which is a continuation of application No. 14/319,421, filed on Jun. 30, 2014, now Pat. No. 9,621,236, which is a
(Continued)

(51) Int. Cl.
| | | |
|---|---|---|
| H04L 1/02 | (2006.01) | |
| H04B 7/0417 | (2017.01) | |
| H04L 25/03 | (2006.01) | |
| H04B 1/04 | (2006.01) | |
| H04B 7/0456 | (2017.01) | |
| H04B 7/06 | (2006.01) | |

(52) U.S. Cl.
CPC ......... *H04B 7/0417* (2013.01); *H04B 1/0475* (2013.01); *H04B 7/0456* (2013.01); *H04B 7/0632* (2013.01); *H04B 7/0639* (2013.01); *H04L 25/03343* (2013.01); *H04L 25/03891* (2013.01)

(58) Field of Classification Search
CPC .. H04B 7/0417; H04B 1/0475; H04B 7/0456; H04B 7/0632; H04B 7/0639; H04B 7/0413; H04B 2001/0425; H04L 25/03343; H04L 25/03891
USPC .......................................................... 375/267
See application file for complete search history.

(56) References Cited

U.S. PATENT DOCUMENTS 6,157,811 A * 12/2000 Dent .................. H04B 7/18515
455/21
7,142,615 B2 * 11/2006 Hongo ..................... H04L 5/06
455/114.3
(Continued)

*Primary Examiner* — Helene E Tayong

(57) ABSTRACT

A method for predistortion including receiving a plurality of input signals forming a multiple-input signal in a multiple-input multiple-output system, generating a pre-distorted multiple-input signal from the received multiple-input signal, generating a multiple-output signal by feeding the pre-distorted multiple-input signal into a multiple-input and multiple-output transmitter, estimating impairments generated by the multiple-input and multiple-output transmitter, the impairments including nonlinear crosstalk between distinct ones of the plurality of input signals; and adjusting the pre-distorted multiple-input signal to compensate for the estimated impairments.

18 Claims, 7 Drawing Sheets

Related U.S. Application Data continuation-in-part of application No. 13/563,621, filed on Jul. 31, 2012, now Pat. No. 8,837,629, which is a continuation-in-part of application No. 13/105,852, filed on May 11, 2011, said application No. 14/319,421 is a continuation-in-part of application No. 12/780,455, filed on May 14, 2010, now Pat. No. 8,767,857.

(60) Provisional application No. 61/213,176, filed on May 14, 2009.

(56) References Cited

U.S. PATENT DOCUMENTS

| | | | |
|---|---|---|---|
| 7,342,976 B2* | 3/2008 | McCallister | H03F 1/34 375/296 |
| 7,940,198 B1* | 5/2011 | Velazquez | H03F 3/19 381/59 |
| 2004/0121741 A1* | 6/2004 | Rashev | H03F 1/3211 700/28 |
| 2008/0057880 A1* | 3/2008 | Copeland | H04B 7/0691 455/101 |
| 2009/0175156 A1* | 7/2009 | Xu | H04L 25/085 370/201 |

\* cited by examiner

MULTI-CELL PROCESSING ARCHITECTURES FOR MODELLING AND IMPAIRMENT COMPENSATION IN MULTI-INPUT MULTI-OUTPUT SYSTEMS

CROSS-REFERENCE TO RELATED APPLICATIONS

The present application is a continuation of and claims priority to, U.S. Ser. No. 16/812,452 filed Mar. 9, 2020 and which is a continuation of U.S. Ser. No. 15/483,382 filed Apr. 10, 2017 and which is a continuation of US Ser. No. 14/319,421 filed Jun. 30, 2014 which is a Continuation-in part of U.S. Ser. No. 12/780,455 filed May 14, 2010 (now U.S. Pat. No. 8,767,857) which claims the benefits of the filing date of U.S. provisional patent application No. 61/213,176 filed on May 14, 2009. US Ser. No. 14,319,421 is a further continuation in part of U.S. Ser. No. 13/563,621 filed Jul. 31, 2012 which is a Continuation-in-Part of and claims the benefit of the filing date of U.S. patent application Ser. No. 13/105,852, filed May 11, 2011, all of which are in their entirety herein incorporated by reference.

TECHNICAL FIELD

This present disclosure relates to the field of wireless communications, and more specifically, to the distortions and impairment's corrections of Multiple Input Multiple Output (MIMO) systems with linear and nonlinear components and unwanted interactions and correlations between multiple input signals.

BACKGROUND

MIMO refers to a system with multiple inputs and multiple outputs. The definition of MIMO system is extended to wireless communication topologies in which multiple modulated signals, separated in frequency or space domain, are simultaneously transmitted through a single/multiple branch radiofrequency (RF) front-end.

MIMO systems, with modulated signals separated in space domain, refer to wireless topologies with multiple branches of RF front-ends, with all branches simultaneously involved in signal transmission. These types of MIMO systems are considered as Multi-branch MIMO systems.

MIMO systems, with modulated signals separated in frequency domain, refer to systems where multiple signals modulated in different carrier frequencies are concurrently transmitted through a single branch RF front-end. These types of MIMO systems are considered as Multi-frequency MIMO systems. Examples of multi-frequency MIMO systems are concurrent dual-band and multi-carrier transmitters. The system in frequency domain comprises two independent baseband signals as the multiple inputs and two up-converted and amplified signals at two carrier frequencies as the multiple outputs. In fact, this type of MIMO system uses a single branch RF front-end to transmit multiple signals.

RF MIMO systems are composed of linear and nonlinear components and/or sub-blocks which may results in signal quality degradation. For example, the power amplifier (PA) is one of the main building blocks of the RF front-end that has a significant nonlinear behavior. This nonlinear relation between the input signal and the amplified output signal of the transmitter results in significant distortions on the output signal. These distortions significantly degrade the output signal's quality and result in poor data communications. In this regard, different techniques to compensate for these distortions were proposed in order to improve the linearity of the RF radio front-end.

Also, there are unwanted and unavoidable interactions and correlations between the different signals in a MIMO system. These interactions are combined with the linear and nonlinear distortions in each branch of the MIMO system to generate more complex distortion effects, which considerably degrade the performance of the MIMO system. The effect of these complex distortions cannot be eliminated or reduced with conventional signal processing algorithms applied to Single Input Single Output (SISO) systems.

Therefore, there is a need for a signal processing technique for MIMO systems that compensates for any distortion, interactions, and crosstalk in the system in order to improve the signal quality of the transmission link.

SUMMARY

MIMO systems require special processing architectures, which compensate for the complex distortions in order to transmit and/or receive good quality signals. Processing architectures that are conventionally used with SISO system do not consider the interactions between the different input signals of the MIMO systems. This requires a more complex processing architecture that considers the effect of interaction between the multiple input signals.

Therefore, according to the present invention, there is provided a method for multiple-input multiple-output impairment pre-compensation comprising: receiving a multiple-input signal; generating a pre-distorted multiple-input signal from the received multiple-input signal; generating a multiple-output signal by feeding the pre-distorted multiple-input signal into a multiple-input and multiple-output transmitter; estimating impairments generated by the multiple-input and multiple-output transmitter; and adjusting the pre-distorted multiple-input signal to compensate for the estimated impairments.

According to the present invention, there is also provided a pre-compensator for use with a multiple-input and multiple-output transmitter, comprising: a multiple-input for receiving a multiple-input signal; a matrix of pre-processing cells for generating a pre-distorted multiple-input signal from the received multiple-input signal; and a multiple-output for feeding the pre-distorted multiple-input signal to the multiple-input and multiple-output transmitter; wherein the pre-processing cells are configured so as to estimate impairments generated by the multiple-input and multiple-output transmitter and adjust the pre-distorted multiple-input signal to compensate for the estimated impairments.

The present invention further relates to a compensator for use with a multiple-input and multiple-output transmitter, comprising: a multiple-input for receiving a multiple-input signal; a matrix of processing cells for generating a distorted multiple-input signal from the received multiple-input signal; and a multiple-output for feeding the pre-distorted multiple-input signal; wherein the pre-processing cells are configured so as to estimate impairments generated by the multiple-input and multiple-output transmitter and adjust the pre-distorted multiple-input signal to compensate for the estimated impairments.

BRIEF DESCRIPTION OF THE DRAWINGS

Embodiments of the invention will be described by way of example only with reference to the accompanying drawings, in which.

DETAILED DESCRIPTION

Linear and nonlinear distortions are the main sources of performance degradation in RF front-ends. These distortions affect the signal quality and lead to an unacceptable data communication. In situations where both linear and nonlinear distortions are present simultaneously, the conventional signal processing algorithms are not able to eliminate and compensate for these distortions. To overcome this drawback, there is provided a signal processing to simultaneously compensate for both linear and nonlinear distortions and impairments.

Figure 1:
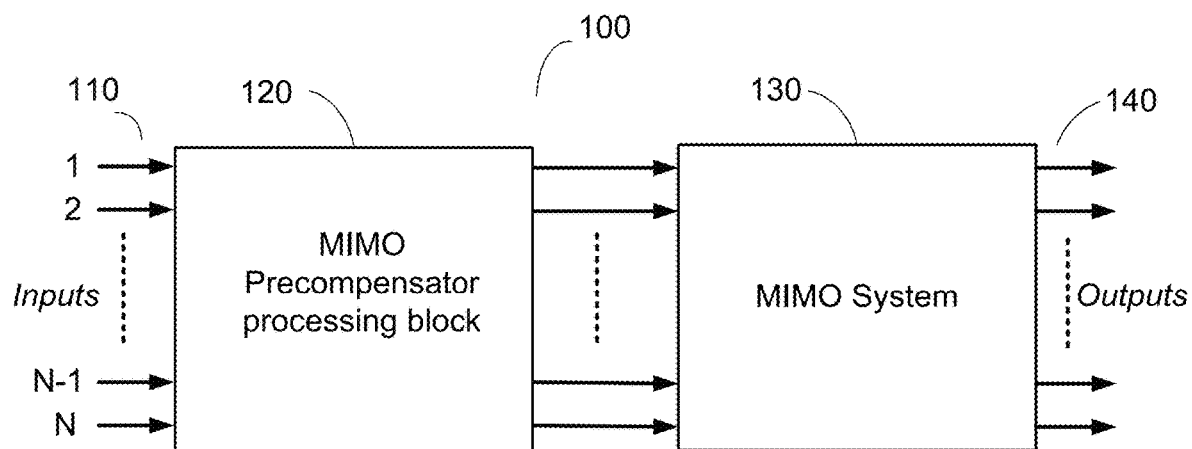
FIG. 1 is a block diagram of a Multiple Input Multiple Output (MIMO) system with a pre-compensator.

Referring to FIG. 1, there is shown an example of a system 100, having multiple inputs 110 and multiple outputs 140, comprising a Multiple Input Multiple Output (MIMO) RF front-end 130 having degraded performance due to the nonlinear behavior of the integrated RF PAs and the coupling effects between the multiple RF paths. In this case, the MIMO RF front-end 130 suffers from a joint effect of linear and nonlinear distortions. A MIMO pre-compensator processing block 120 is cascaded to the MIMO RF front-end 130 to compensate for all linear and nonlinear distortions of the MIMO system 100.

Figure 2:
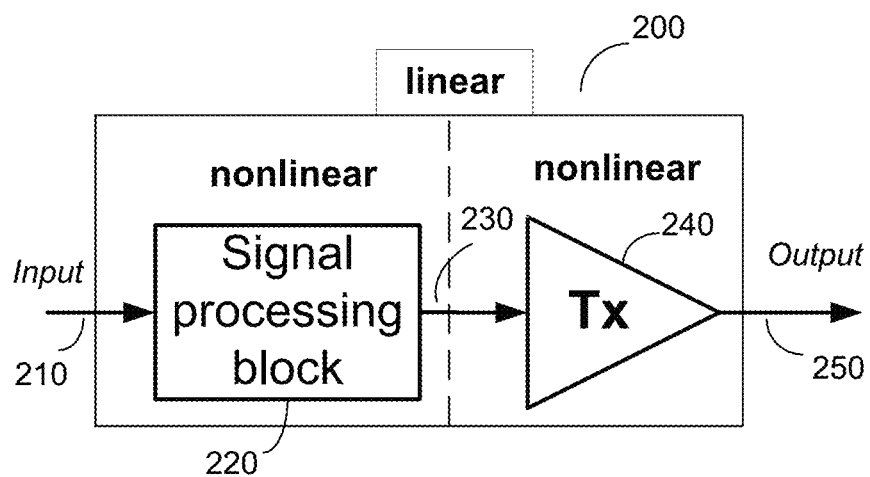
FIG. 2 is a block diagram of an example of pre-distortion linearization technique in the form of a cascade of a signal processing block and a transmitter.

Referring now to FIG. 2, there is shown an example of pre-distortion linearization 200 for a Single Input Single Output (SISO) transmitter, which may be used to illustrate the basic concept behind signal pre-processing methods. Pre-distortion linearization 200 includes a signal processing block 220, which pre-processes the input baseband signal 210 to generate a pre-distorted baseband signal 230. Then the pre-distorted signal 230 is supplied to the nonlinear transmitter 240 to produce an output signal 250. Both the signal processing block 220 and the transmitter 240 have nonlinear behavior; however, the cascade of both block 220 and transmitter 240 has a linear response. Therefore, the output signal 250 is a linear amplified version of the input baseband signal 210. If f(x) is a function that models the nonlinear behavior of the transmitter 240 extracted using the baseband input signal (z) 230, and the equivalent complex envelope of sampled RF signal at the output of the transmitter (y) 250, the pre-distortion function of the signal processing block 220, g(x), has to satisfy the following set of relations:

$$y=f(z) \text{ and } z=g(x)$$

$$f(g(x))=G_o x \qquad \text{Equation 1}$$

where $G_o$ is the linear or small-signal gain of the transmitter 240.

Figure 3:
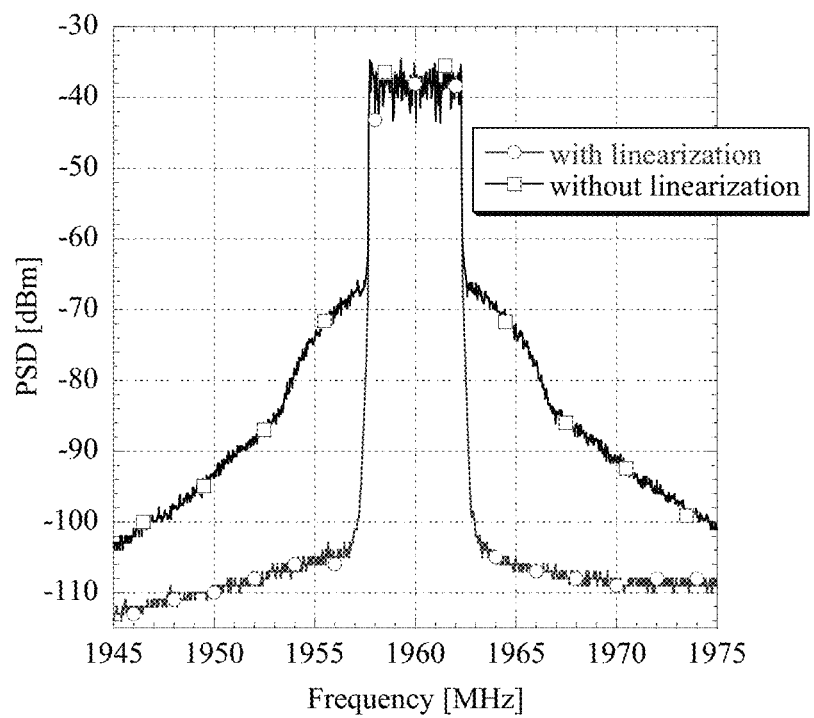
FIG. 3 is a graph of measured output spectrums of a Single Input Single Output (SISO) transmitter with and without digital pre-distortion linearization technique.

FIG. 3 shows the output spectrum of the nonlinear transmitter 240 presented in FIG. 2 with and without using the signal processing block 220 (with linearization and without linearization, respectively in FIG. 3). The use of the signal processing block 220 significantly reduces the out-of-band distortion of the signal and improves quality of the signal.

In transmitters for multi-branch MIMO systems, the transmitter's linear and nonlinear distortions on each branch may be coupled because of the interference and crosstalk between the multiple front-ends of the transmitter. Indeed, crosstalk or coupling is more likely to happen between the paths in the case of multiple RF paths with the same operating frequency and power. This crosstalk phenomenon is expected to be more significant in integrated circuit (IC) design, where the size of the prototype is a critical design parameter.

Figure 4:
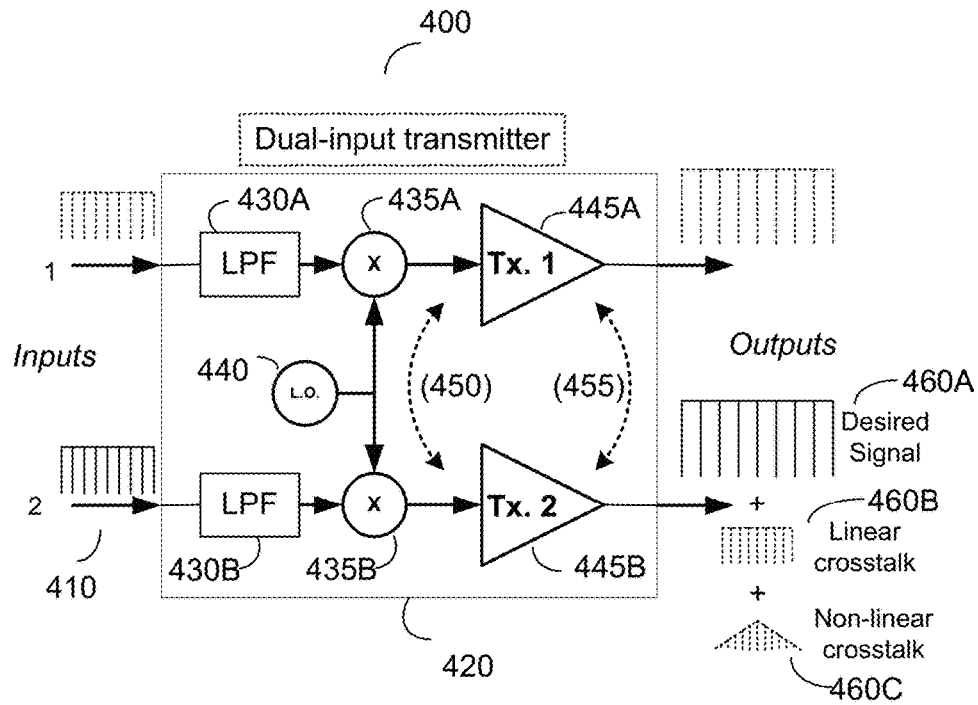
FIG. 4 is a block diagram of a dual branch MIMO transmitter.

Referring to FIG. 4, there is shown a dual branch MIMO transmitter 420 as an example of a multi-branch MIMO system 400. The dual branch MIMO transmitter 420 comprises low pass filters 430A and 430B, up-converters 435A and 435B and a local oscillator (L.O.) 440, and nonlinear transmitters 445A and 445B. The transmitters 445A and 445B exhibit nonlinear and/or linear distortion behaviors. The distortion behaviors may include but not limited to nonlinear power response of the active devices such as the power amplifier, frequency response, memory effect, branch imbalance, DC and carrier offset, and/or image interference.

The crosstalk or coupling in dual branch MIMO transmitter may be classified as linear crosstalk, 455, and/or nonlinear crosstalk, 450. The crosstalk is considered linear when the effect of the crosstalk at the output of the transmitter 460 can be modeled as a linear function of the interference 460B and desired signal 460A. In other words, the input signals 410 affected by linear crosstalk 455 do not pass through nonlinear components such as 445A and 445B. Conversely, the nonlinear crosstalk 450 affects the input signals 410 before it passes through nonlinear components such as 445A and 445B. The nonlinear crosstalk produces undesired signal 460C at the output of the dual branch MIMO transmitter 400. The sources of nonlinear crosstalk 450 may be interferences in the chipsets between the different paths of the MIMO transceiver and leakage of RF signals through the common local oscillator 440 path.

Figure 5:
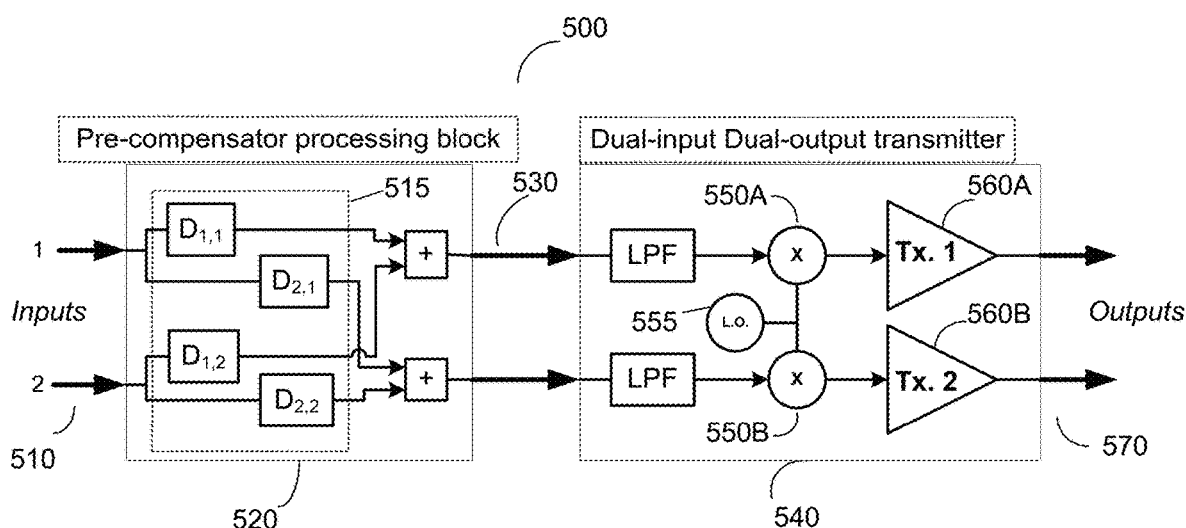
FIG. 5 is a block diagram of a MIMO system with a digital pre-compensator having four cells and a dual branch MIMO transmitter.

Referring now to FIG. 5, there is shown a MIMO system 500 comprising a digital pre-compensator 520 with dual inputs and dual outputs cascaded in front of a dual branch MIMO transmitter 540 similar to the one illustrated in FIG. 4 (with components 550A, 550B, 555, 560A and 5606 of FIG. 5 corresponding to components 435A, 435B, 440, 445A and 445B of FIG. 4). The digital pre-compensator 520 uses a matrix of four processing cells 515 in order to compensate for the dual branch nonlinearities and any crosstalk and interference (impairments) between the two RF paths. The digital pre-compensator 520 comprises means, for example the processing cells, using the input signals 530 and output signals 570 of the dual branch MIMO transmitter 540 to estimate any nonlinearities and interferences (impairments) and identify a proper processing function for each of the four processing cells 515. After identification, the input signals 510 are supplied to the four processing cells 515 to generate and adjust the pre-distorted signals 530. Then the pre-distorted signals 530 are supplied to the dual branch MIMO transmitter 540. The cascade of the digital pre-compensator 520 and the dual branch MIMO transmitter 540 exhibit linear behavior. The output signals 570 are the linear amplified version of the input signals 510 without the effect of the transmitter linear and nonlinear distortions and crosstalk on the quality of the signals. Therefore, the digital pre-compensator 520 compensate for all the linear and nonlinear distortions and crosstalk (impairments) in the different branches of the MIMO transmitter 540.

Figure 6:
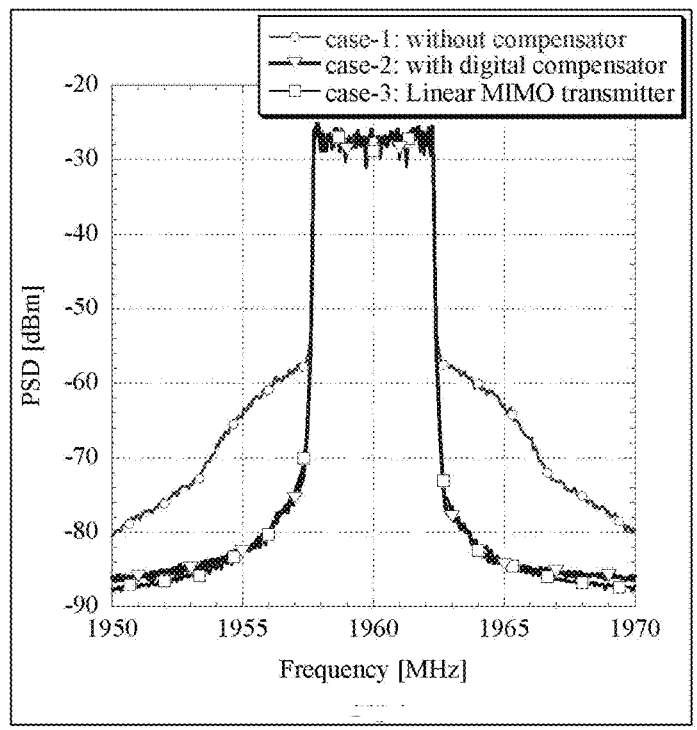
FIG. 6 is a graph of measured output spectrum of a dual branch MIMO transmitter with and without the pre-compensation signal processing technique and for the linear MIMO transmitter.

Referring to FIG. 6, there is shown the measured output spectrum of the dual branch MIMO transmitter 540 for three cases: case-1) in the presence of −20 dB crosstalk and without using the digital pre-compensator 520, case-2) in the presence of −20 dB crosstalk and using the digital pre-compensator 520, and case-3) for a perfect MIMO transmitter without any crosstalk and nonlinearities. The output spectrum of case-2 with −20 dB crosstalk and digital pre-compensator 520 is almost following the one in case-3; this demonstrates that the digital pre-compensator 520 can compensate for the effect of both transmitter nonlinearities and crosstalk (impairments).

Figure 7:
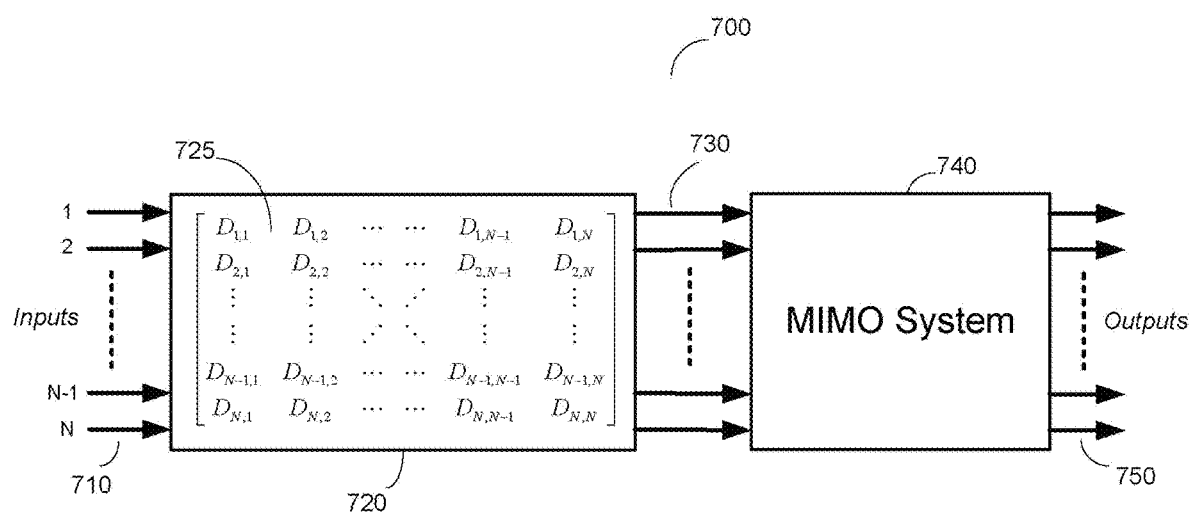
FIG. 7 is a block diagram of a MIMO system with a number N of RF paths cascaded with a digital pre-compensator.

Referring to FIG. 7, there is shown an example of a system 700 comprising a digital pre-compensator with multiple inputs and multiple outputs 720, having a RF front-end 740 with a number N of outputs 750. The digital pre-compensator 720 can be modeled as a N×N matrix 725 where each cell of the matrix represents a processing block. For example, $D_{i,j}$ represents the processing block between the $i^{th}$ input signal and the $j^{th}$ output of the digital compensator 720. The matrix representation of the digital compensator block based on the input signals x 710 and output signals Y 730 can be expressed as follows:

and, $\vec{x}=[x(1)\ x(2)\ \ldots\ x(N)]^T$ is an N×1 vector representing N samples of the input signal, and K and Q are the maximum polynomial order and memory depth.

Figure 8:
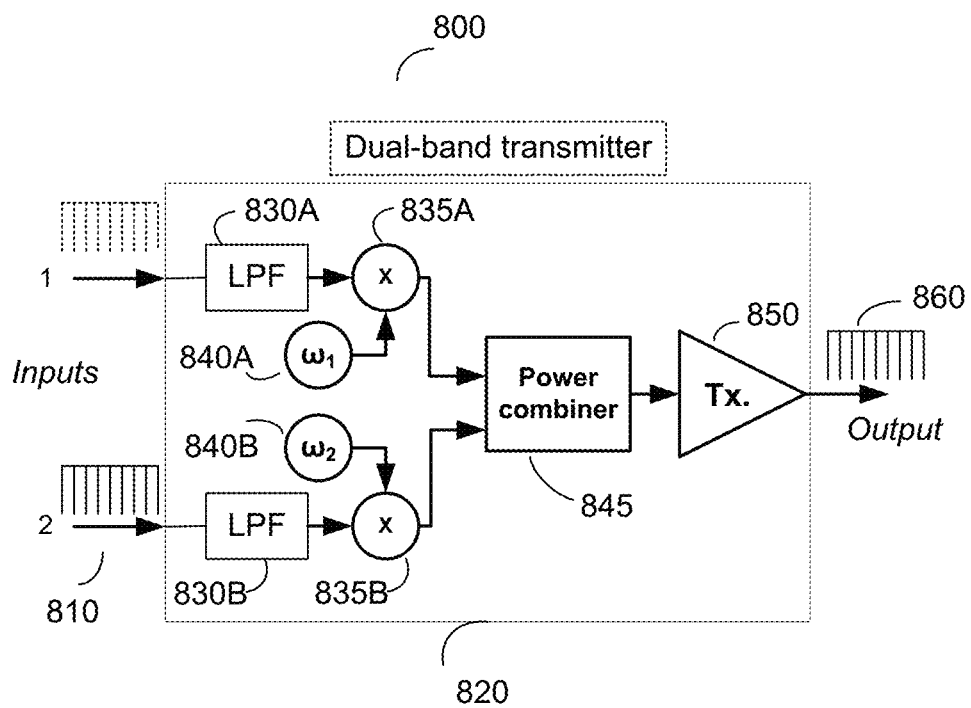
FIG. 8 is a block diagram of a dual-band transmitter with dual inputs and single branch nonlinear transmitter.

Referring to FIG. 8, there is shown an example of a multi-frequency MIMO system 800 in the form of a dual-band transmitter 820 having inputs 810 and output 860. The dual-band transmitter 820 consists of low pass filters 830A and 830B, up-converters 835A and 835B, local oscillators (L.O.) 840A and 840B, and nonlinear transmitter 850. The input signals are up-converted to carrier frequencies $\omega_1$ and $\omega_2$ from local oscillators 840A and 840B using up-converters 835A and 835B. The up-converted signals from the up-converters 835A and 8356 are combined by means of a power combiner 845 and are supplied, after combination, to the dual-band transmitter 850. The dual-band transmitter 850 exhibits nonlinear and/or linear distortions (impairments) behaviors. The distortion behaviors may include but not limited to nonlinear power response of the active devices such as the power amplifier, frequency response and memory effect.

Figure 9:
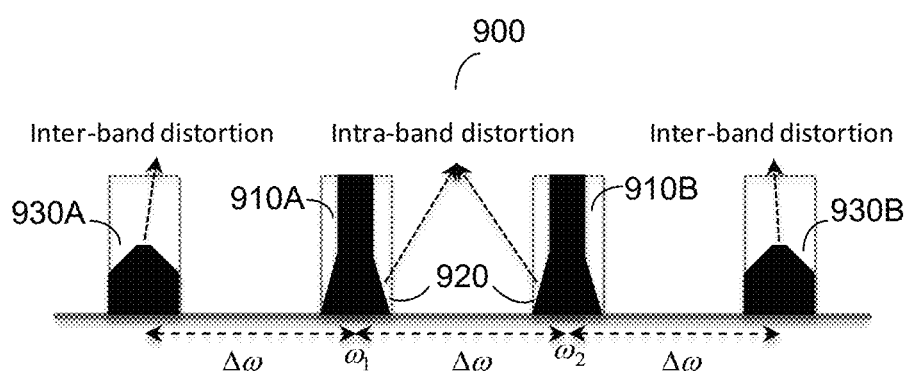
FIG. 9 is a graph of the output signal from a nonlinear transmitter which shows intra-band and inter-band distortions.

Referring to FIG. 9, there is shown the output signal of the dual-band transmitter 820 presented in FIG. 8. Due to nonlinear behavior of the dual-band transmitter 820, the output signal 900 of the transmitter 820 consists of desired signals 910A and 910B at carrier frequencies $\omega_1$ and $\omega_2$, intra-band distortions 920, and inter-band distortions 930A and 9308.

Figure 10:
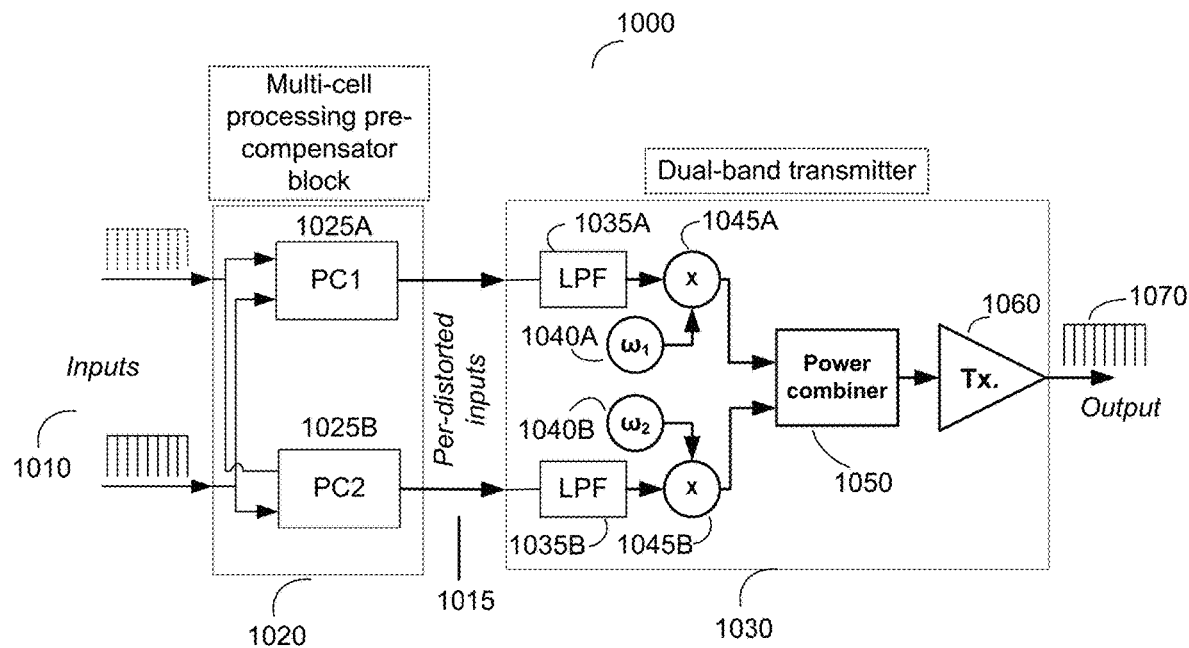
FIG. 10 is a block diagram of a system comprising a multi-cell processing pre-compensator cascaded with a dual-band transmitter.

Referring now to FIG. 10, there is shown a system 1000 comprising a digital multi-cell processing pre-compensator 1020 with dual inputs 1010 and dual pre-distorted outputs 1015 cascaded in front of a dual-band transmitter 1030 similar to the one illustrated in FIG. 8 (with components 1035A, 1035B, 1040A, 1040B, 1045A, 1045B, 1050 and 1060 of FIG. 10 corresponding to components 830A, 830B, 840A, 840B, 835A, 8356, 845 and 850 of FIG. 8). The digital multi-cell pre-compensator 1020 uses a matrix of two processing cells, 1025A and 1025B, in order to compensate for the dual-band transmitter's nonlinearities and any intra-band distortions (impairments) between the two RF signals. The digital multi-cell pre-compensator 1020 with dual inputs 1010 and dual outputs 1015 comprises means, for example the processing cells 1025A and 1025B, using the input signals 1010 and output signal 1070 of the dual-band $$\begin{bmatrix} \vec{Y}_1 & \ldots & \vec{Y}_i & \ldots & \vec{Y}_N \end{bmatrix} = \begin{bmatrix} A_{\vec{x}_1} & \ldots & A_{\vec{x}_i} & \ldots & A_{\vec{x}_N} \end{bmatrix} \begin{bmatrix} D_{1,1} & D_{1,2} & \cdots & \cdots & D_{1,N-1} & D_{1,N} \\ D_{2,1} & D_{2,1} & \cdots & \cdots & D_{2,N-1} & D_{2,N} \\ \vdots & \vdots & \ddots & \ddots & \vdots & \vdots \\ \vdots & \vdots & \ddots & \ddots & \vdots & \vdots \\ D_{N-1,1} & D_{N-1,2} & \cdots & \cdots & D_{N-1,N-1} & D_{N-1,N} \\ D_{N,1} & D_{N,2} & \cdots & \cdots & D_{N,N-1} & D_{N,N} \end{bmatrix}$$ Equation 2 where the parameters in Equation 2 are defined as:

$A_{\vec{x}} = [\beta_{\vec{x}}^0 \ \ldots \ \beta_{\vec{x}}^q \ \ldots \ \beta_{\vec{x}}^Q]$ is an N×K(Q+1) matrix, Equation 3

$$\beta_{\vec{x}}^q = \begin{bmatrix} 0_{1 \times q} & 0_{1 \times q} & \cdots & 0_{1 \times q} \\ \beta_1(x(1)) & \beta_2(x(1)) & \cdots & \beta_K(x(1)) \\ \vdots & \vdots & \ddots & \vdots \\ \beta_1(x(N-q)) & \cdots & \cdots & \beta_K(x(N-q)) \end{bmatrix}$$

is an N×K matrix, and
$\beta_k(x(n))$ is defined as:

$\beta_k(x(n)) = |x(n)|^{k-1} x(n)$ transmitter 1030 to estimate any nonlinearities and distortions (impairments) and identify a proper processing function for each of the two processing cells PC1 1025A and PC2 1025B. After identification, the input signals 1010 are supplied to the two processing cells 1025A and 1025B to generate and adjust the pre-distorted signals 1015. Then the pre-distorted signals 1015 are supplied to the dual-band transmitter 1030. The cascade of the digital compensator 1020 and the dual-band transmitter 1030 exhibits linear behavior. The output signal 1070 is the linear amplified version of the input signals 1010 without the effect of the transmitter's nonlinearities and intra-band distortions (impairments) on the quality of the output signal. Therefore, the digital multi-cell processing pre-compensator block 1020 compensate for all the linear and nonlinear distortions (impairments) of the dual-band transmitter 1030.

Figure 11:
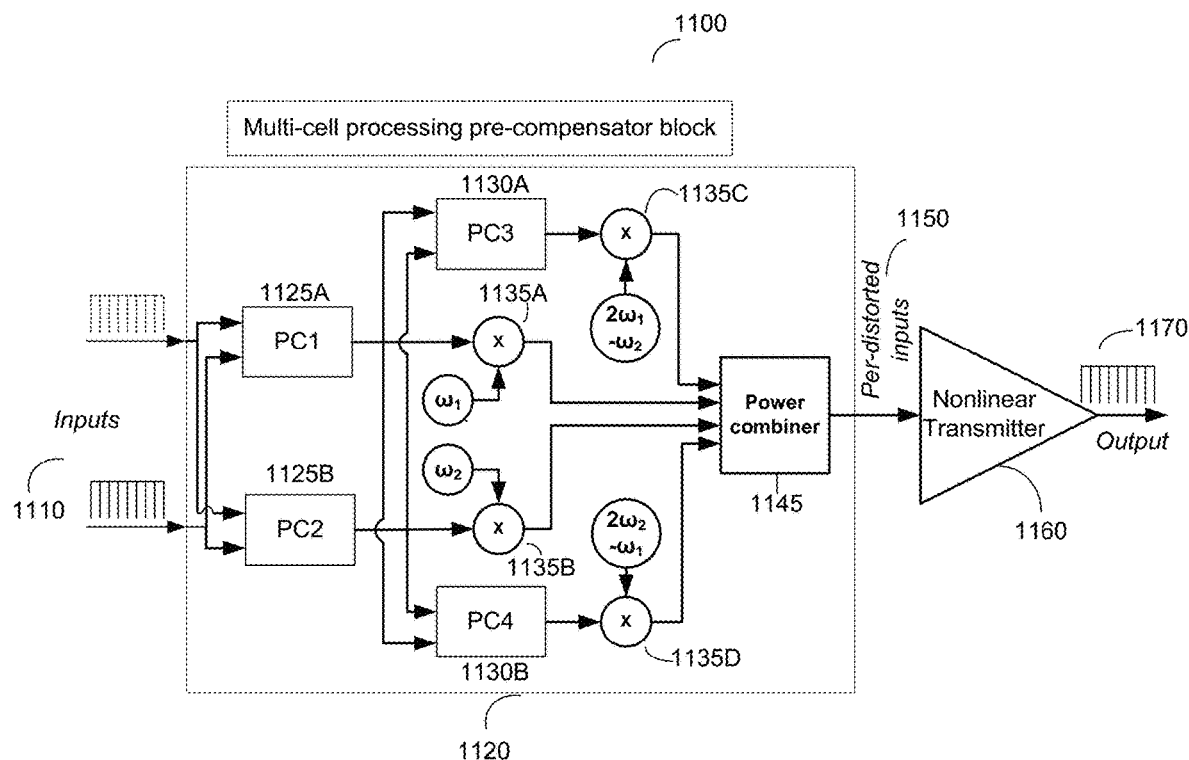
FIG. 11 is a block diagram of a system comprising a multi-cell processing pre-compensator cascaded with a multi-carrier transmitter.

Referring to FIG. 11, there is shown a system 1100 comprising a digital multi-cell processing pre-compensator 1120 with dual inputs 1110 and pre-distorted output 1150 cascaded in front of a multi-carrier transmitter 1160. The digital multi-cell pre-compensator 1120 uses a matrix of four processing cells, 1125A, 1125B, 1130A and 1130B, in order to compensate for the multi-carrier transmitter's 1160 non-linearities and any intra-band and inter-band distortions (impairments) between the two RF signals. The digital multi-cell pre-compensator 1120 comprises means, for example the processing cells 1125A, 1125B, 1130A and 1130B, using the input signals 1110 and the output signal 1170 of the multi-carrier transmitter 1160 to estimate any nonlinearities and distortions (impairments) and identify a proper processing functions for each of the four processing cells PC1 1125A, PC2 1125B, PC3 1130A, and PC4 1130B. The processing cells PC1 1125A and PC2 1125B compensate for the intra-band distortions and transmitter's nonlinearities around carrier frequencies $\omega_1$ and $\omega_2$. The processing cells PC3 1130A and PC4 1130B compensate for the inter-band distortions at frequency bands centered at $2\omega_1-\omega_2$ and $2\omega_2-\omega_1$. The pre-distorted output signals of the processing blocks are then up-converted to designated carrier frequencies using the up-converters 1135A, 1135B, 1135C, and 1135D. Finally, the up-converted signals are combined in power combiner 1145 and feed the input of the nonlinear multi-carrier transmitter 1160. The cascade of the digital multi-cell pre-compensator 1120 and the dual-band transmitter 1160 exhibit linear behavior. The output signal 1170 is the linear amplified version of the input signals 1110 without the effect of the transmitter's nonlinearities, inter-band, and intra-band distortions (impairments) on the quality of the output signal. Therefore, the digital multi-cell pre-compensator 1120 compensates for all the linear and nonlinear distortions of the multi-carrier transmitter 1160.

Figure 12:
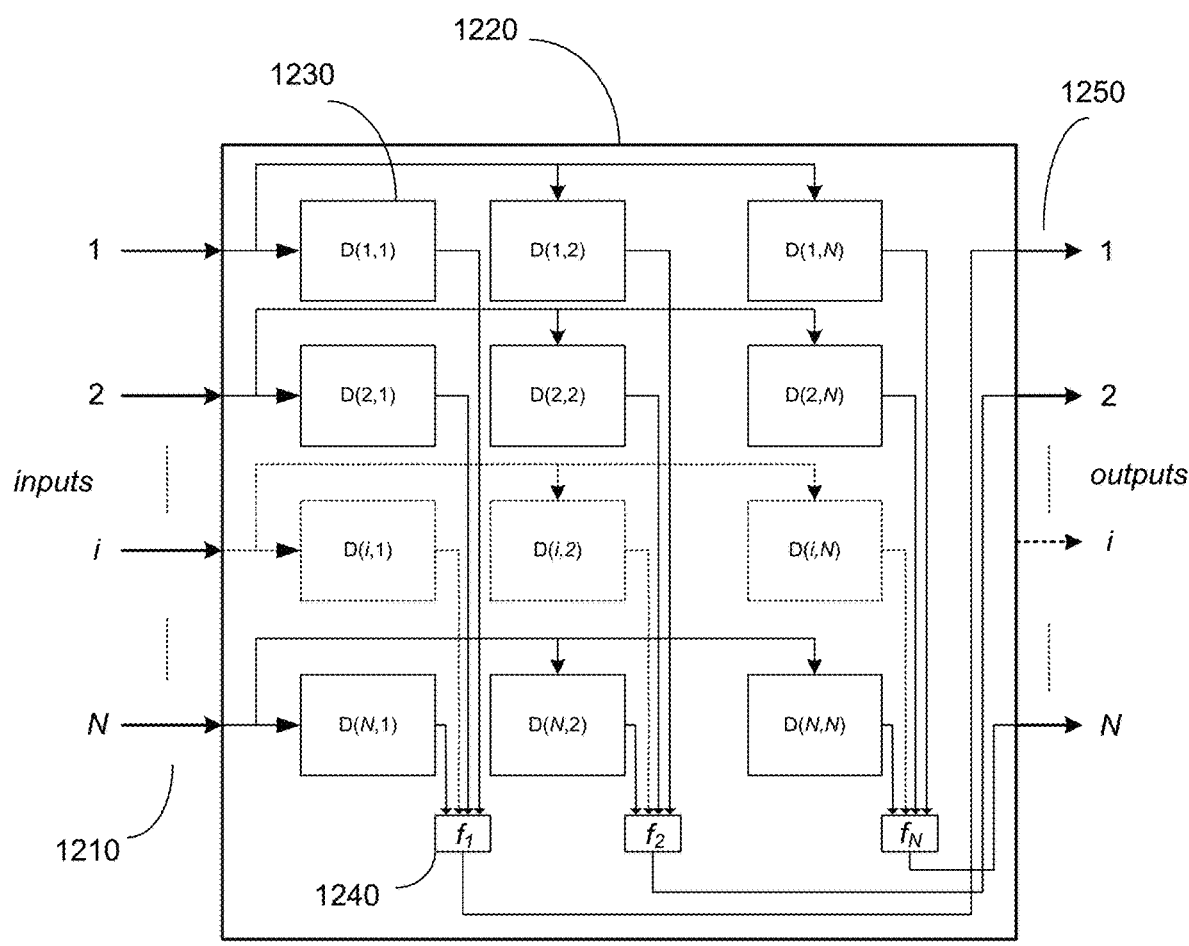
FIG. 12 is a diagram of a processing cells matrix for MIMO systems.

Referring to FIG. 12, there is shown a system comprising a digital pre-compensator 1220 with multiple inputs 1210 and multiple outputs 1250 used for forward behavior modeling and simulation of the linear/nonlinear behavior of multi-branches and multi-frequencies MIMO systems. The digital pre-compensator 1200 is modeled as a N×N matrix with $N^2$ cells 1230, with N inputs 1210 and N outputs 1250, where each cell of the matrix represents a processing block. For example, D(i,j) represents the processing block where the input of the processing cell is the i.sup.th input 1210 of the MIMO system and the output of the processing cell is the input of the function $f_j$, which its output is the $j^{th}$ output 1240 of the digital pre-compensator 1220. The functions $f_i$ 1240 can be modeled as linear or nonlinear functions with/without considering the memory of the system.

Depending on the architecture of the MIMO system, the digital compensator with multiple inputs and multiple outputs 1220 can be added before or after the MIMO system as pre-compensator or post-compensator.

Therefore, as taught by the above disclosure:

The pre-distorted multiple-input signal may be adjusted to introduce linear and nonlinear distortions on each signal path of the multiple-input signal to compensate for estimated impairments; and The pre-distorted multiple-input signal may be adjusted to introduce interference between each signal path of the multiple-input signal to compensate for estimated impairments.

Each of the above described pre-processing cells may include nonlinear processing blocks compensating for multiple-input multiple-output nonlinear distortions and an effect of interferences between signal paths of the multiple-input signal and signal paths of the multiple-output signal. The nonlinear processing blocks process the multiple-input signal and the multiple-output signal to determine a desired multiple-output signal that pre-compensates for the nonlinear distortions; and estimating a nonlinear function for each nonlinear processing block.

Each of the above described pre-processing cells may include linear processing blocks compensating for multiple-input multiple-output linear distortions and an effect of interferences between signal paths of the multiple-input signal and signal paths of the multiple-output signal. The linear processing blocks process the multiple-input signal and the multiple-output signal to determine a desired multiple-output signal that pre-compensates for the linear distortions, and estimate a linear function for each linear processing block.

Each of the above described pre-processing cells of the matrix may comprise nonlinear processing blocks compensating for multiple-input multiple-output nonlinear distortions and an effect of interferences between signal paths of the multiple-input signal and signal paths of the multiple-output signal, and linear processing blocks compensating for the multiple-input multiple-output linear distortions and the effect of interferences between the signal paths of the multiple-input signal and the signal paths of the multiple-output signal. The non-linear and linear processing blocks process the multiple-input signal and the multiple-output signal to determine a desired multiple-output signal that pre-compensates for the non-linear and linear distortions, estimate a non-linear function for each non-linear processing block, and estimate a linear function for each linear processing block.

Each of the above described pre-processing cells of the matrix may model a behavior of multi-input multi-output system and may include a nonlinear processing block to compensate for the multiple-input multiple-output system linear distortions and an effect of interferences between signal paths of the multiple-input signal and signal paths of the multiple-output signal, and a linear processing block to compensate for the multiple-input multiple-output system linear distortions and the effect of interferences between the signal paths of the multiple-input signal and the signal paths of the multiple-output signal. Each of the non-linear and linear processing blocks process the multiple-input signal and the multiple-output signal to determine a desired multiple-output signal that pre-compensates for the non-linear and linear distortions, estimate a non-linear model for each non-linear processing block, and estimate a linear model for each linear processing block.

Those of ordinary skill in the art will realize that the description of the system and methods for digital compensation are illustrative only and are not intended to be in any way limiting. Other embodiments will readily suggest themselves to such skilled persons having the benefit of this disclosure. Furthermore, the disclosed systems can be customized to offer valuable solutions to existing needs and problems of the power efficiency versus linearity tradeoff encountered by designers of wireless transmitters in different applications, such as satellite communication applications and base and mobile stations applications in wireless communication networks.

In the interest of clarity, not all of the routine features of the implementations of signal pre-compensation processing mechanism are shown and described. It will, of course, be appreciated that in the development of any such actual implementation of the network access mechanism, numerous implementation-specific decisions must be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of telecommunication networks having the benefit of this disclosure.

In accordance with this disclosure, the components, process steps, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of process steps is implemented by a computer or a machine and those process steps can be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein.

Although the present invention has been described hereinabove by way of non-restrictive illustrative embodiments thereof, these embodiments can be modified at will within the scope of the appended claims without departing from the spirit and nature of the present invention.

The invention claimed is:

1. A method for predistortion, the method comprising:
receiving a plurality of input signals forming received multiple input (MI) signals;
generating a pre-distorted MI signal from the received MI signals;
generating a multiple-output (MO) signal by feeding the pre-distorted MI signal into a multiple-input and multiple-output (MIMO) transmitter;
estimating a MIMO digital predistortion (DPD) behavioral model of the MIMO transmitter by comparing the pre-distorted MI signals and the MO signal of the MIMO transmitter; and
adjusting at least one signal in the received MI signal to generate the pre-distorted MI signal to compensate for impairments in the MIMO transmitter by applying a processing function identified by the behavioral model to the at least one signal.

2. A method for predistortion, the method comprising:
receiving along a plurality of signal paths respective input signals forming a received multiple-input (MI) signal in a multiple-input multiple-output (MIMO) system;
generating a pre-distorted MI signal from the received MI signal;
generating a multiple-output (MO) signal by feeding the pre-distorted MI signal into a MIMO transmitter;
estimating a MIMO digital predistortion (DPD) behavioral model by comparing the pre-distorted MI signals and the MO signals of the MIMO transmitter; and
for each signal path, adjusting at least one of the received MI signals to compensate for the estimated impairments, wherein generating the pre-distorted MI signals includes pre-processing, based on the behavioral model, of the at least one of the received MI signals, using:
first linear and nonlinear processing to compensate for nonlinear distortions of the MIMO transmitter; and
second linear processing to compensate for linear distortions of the MIMO transmitter.

3. The method of claim 2, wherein the first linear and nonlinear processing is based on analytic processing functions.

4. The method of claim 2, wherein the first linear and nonlinear processing is based on neural networks.

5. The method of claim 2, wherein the first linear and nonlinear processing is based on look up tables.

6. The method of claim 2, wherein the adjusting includes introducing linear and nonlinear distortions in the signal path of the MI signal.

7. The method of claim 2, wherein the adjusting includes introducing interference between signal paths of the MI signal.

8. The method of claim 2, wherein the adjusting includes introducing interference between each signal path of the MI signal.

9. The method of claim 2, wherein nonlinear processing includes:
processing the MI signal and the MO signal to determine a desired MO signal that pre-compensates for the nonlinear distortions; and
estimating, based on the desired MO signal, nonlinear processing functions.

10. The method of claim 2, wherein linear processing includes:
processing the MI signal and the MO signal to determine a desired MO signal that pre-compensates for the linear distortions; and
estimating, based on the desired MO signal, linear processing functions.

11. The method of claim 2, wherein the non-linear and linear processing includes:
processing the MI signal and the MO signal to determine a desired MO signal that pre-compensates for the non-linear and linear distortions;
estimating, based on the desired MO signal, linear processing functions; and
estimating, based on the desired MO signal, nonlinear processing functions.

12. The method of claim 2, wherein said DPD behavioral model is estimated for combinations of each of the MI signals and each of the MO signals to forming matrix of preprocessing cells, wherein each element of the matrix of pre-processing cells models a behavior of the MIMO system.

13. A predistorter for a transmitter, comprising:
multiple transmit signal paths forming a multiple-input MI signal received from MI signals for feeding to a MIMO transmitter; and
a preprocessor having:

a MI for receiving the MI signal and for generating a pre-distorted MI signal from the received MI signal; and a multiple-output (MO) for feeding the pre-distorted MI signal to the MIMO transmitter, and wherein the pre-processor is configured to estimate impairments generated by MIMO transmitter and adjust the pre-distorted MI signal to compensate for the estimated impairments, the estimates based on a MIMO digital predistortion (DPD) behavioral model of the MIMO transmitter by comparing the pre-distorted MI signals and the MO signals of the MIMO transmitter.

14. The predistorter of claim 13, the preprocessor further including a matrix of pre-processing cells wherein each of the pre-processing cells of the matrix includes:

nonlinear processing blocks compensating for MIMO nonlinear distortions and an effect of interference between signal paths of the MI signal and signal paths of the MO signal; and linear processing blocks compensating for MIMO linear distortions and the effect of interference between the signal paths of the MI signal and the signal paths of the MO signal.

15. The predistorter of claim 14, wherein the nonlinear processing blocks are configured to: process the MI signal and the MO signal to determine a desired MO signal that pre-compensates for the nonlinear distortions; and estimate a nonlinear function for each nonlinear processing block.

16. The predistorter of claim 14, wherein the linear processing blocks are configured to:

process the multiple-input signal and the multiple-output signal to determine a desired multiple-output signal that pre-compensates for the linear distortions; and estimate a linear function for each linear processing block.

17. The predistorter of claim 14, wherein the non-linear and linear processing blocks are configured to:

process the multiple-input signal and the multiple-output signal to determine a desired multiple-output signal that pre-compensates for the non-linear and linear distortions, respectively;

for the non-linear processing blocks, estimate a non-linear function for each nonlinear processing block; and for the linear processing blocks, estimate a linear function for each linear processing block.

18. The predistorter of claim 14, wherein each of the pre-processing cells of the matrix models a behavior of a multi-input multi-output system.

* * * * *